(12) United States Patent
Miyamoto et al.

(10) Patent No.: US 6,438,640 B1
(45) Date of Patent: Aug. 20, 2002

(54) COMPUTER SYSTEM AND ITS CONTROL METHOD

(75) Inventors: Tomofumi Miyamoto; Toru Hanada, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/324,545

(22) Filed: Jun. 2, 1999

(30) Foreign Application Priority Data

Jun. 3, 1998 (JP) ............................................. 10-154641

(51) Int. Cl.[7] ........................... G06F 13/00; G06F 13/20
(52) U.S. Cl. ........................ 710/303; 710/304; 713/200
(58) Field of Search ................................. 710/303, 304, 710/300, 301; 713/200, 202, 201, 100, 310

(56) References Cited

U.S. PATENT DOCUMENTS

| | | | | |
|---|---|---|---|---|
| 5,463,742 A | * | 10/1995 | Kobayashi | ................. 710/303 |
| 5,721,835 A | * | 2/1998 | Niwa et al. | ................. 710/303 |
| 5,742,833 A | * | 4/1998 | Dea et al. | ................... 713/323 |
| 5,938,771 A | * | 8/1999 | Williams et al. | ............ 713/310 |
| 6,049,885 A | * | 4/2000 | Gibson et al. | .............. 713/324 |

FOREIGN PATENT DOCUMENTS

JP         6-289954         10/1994

* cited by examiner

*Primary Examiner*—Peter Wong
*Assistant Examiner*—Tim Vo
(74) *Attorney, Agent, or Firm*—Finnegan, Henderson, Farabow, Garrett & Dunner, L.L.P.

(57) ABSTRACT

When the wakeup signal generation function of a LAN docker is enabled, an ID (Dock_ID) peculiar to the LAN docker is registered in a PC main body. When the PC main body wakes up from the stop or sleep state in response to a wakeup signal Wake_up generated by a LAN controller in the LAN docker, a system BIOS collates the Dock_ID in the PC main body with the Dock_ID of the currently connected LAN docker. Only when a coincidence between the two IDs is detected by this collation process, the PC main body is accessible from a server using the LAN controller, thus allowing remote accesses.

19 Claims, 7 Drawing Sheets

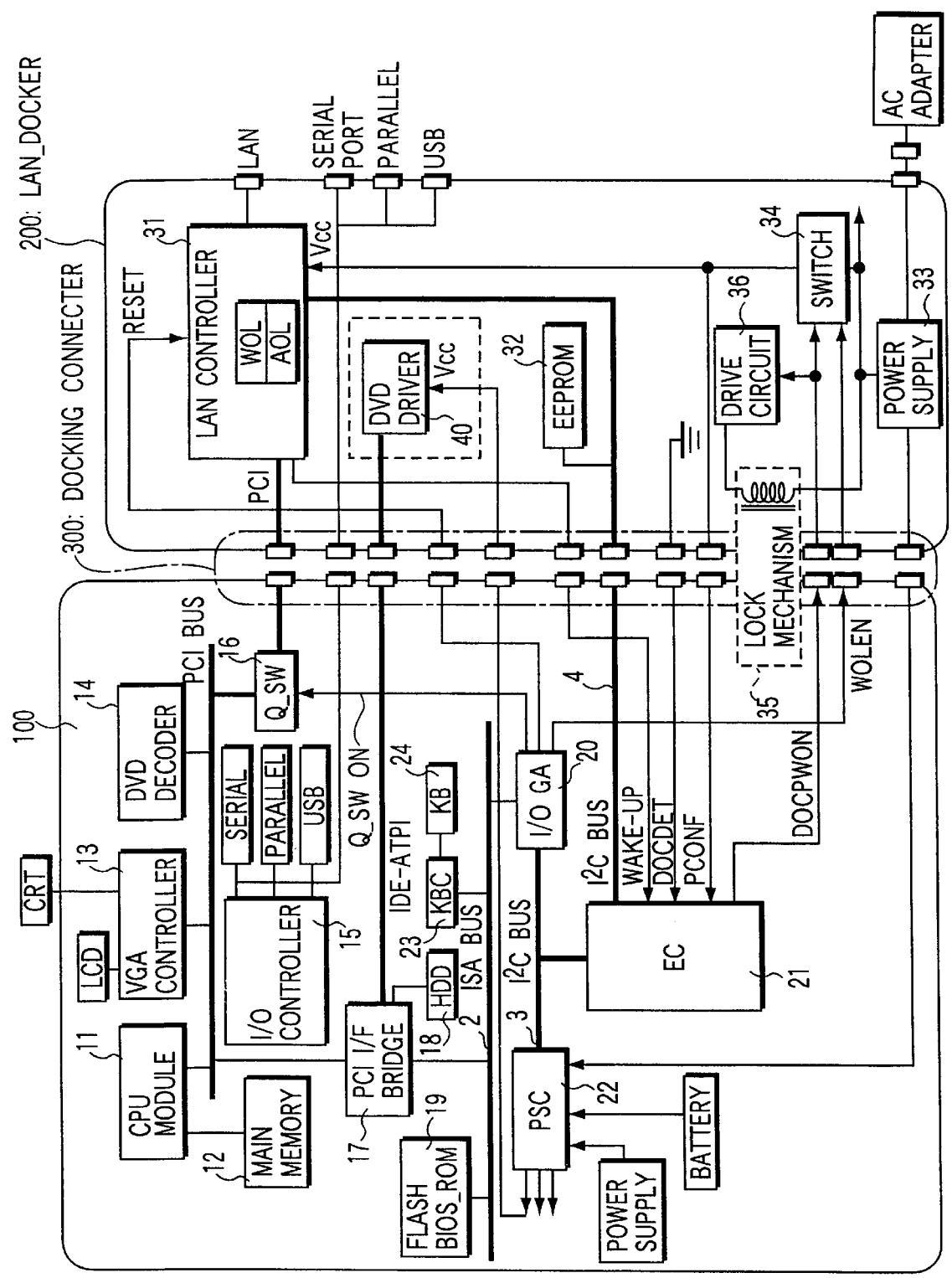
F I G. 1

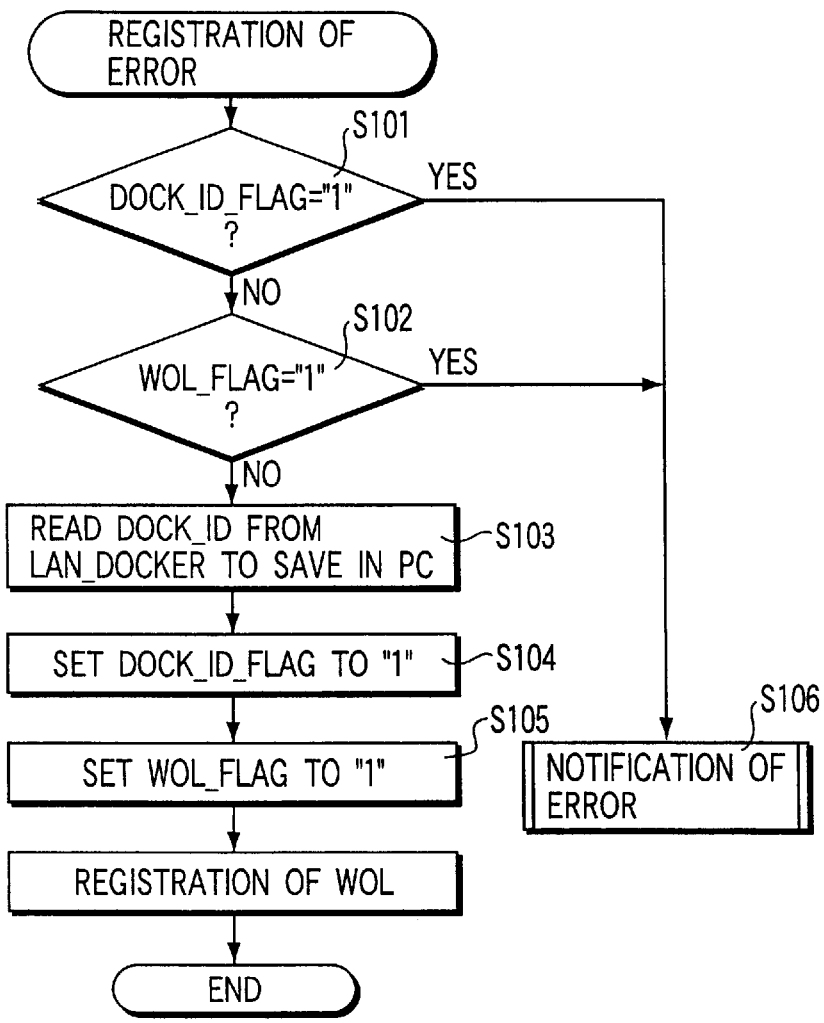
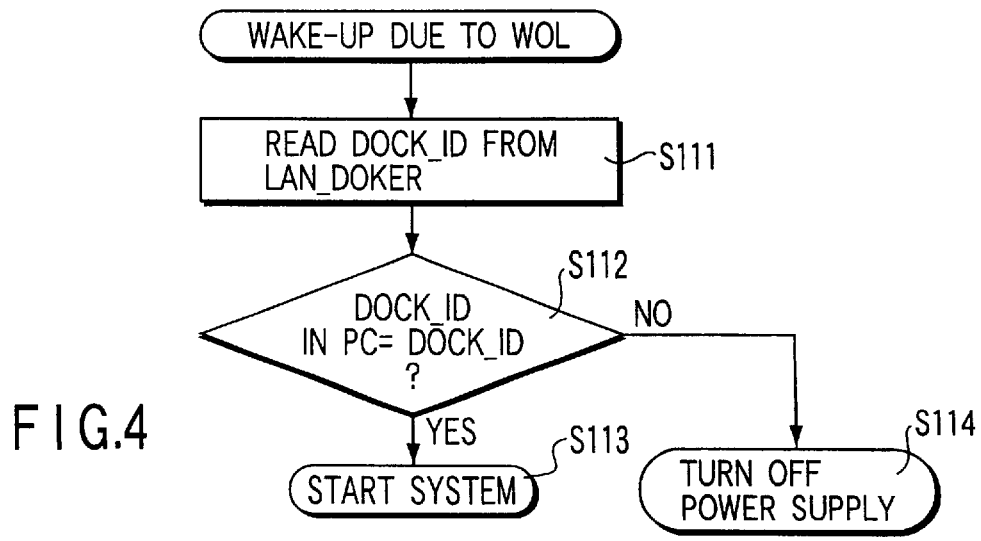
FIG.3
FIG.4

COMPUTER SYSTEM AND ITS CONTROL METHOD

BACKGROUND OF THE INVENTION

This application is based on Japanese Patent Application No. P10-154641, filed Jun. 30, 1998, the contents of which are incorporated herein by reference.

The present invention relates to a computer system and its control method and, more particularly, to a computer system with a wakeup function that allows the computer system to return from a stop or sleep state to an operative state in response to a specific packet received from a network, and a wakeup function control method.

In recent years, personal computers (PCs) have been used as information tools for companies. However, an increase in TCO (Total Cost of Ownership) required for system maintenance/management of the entire company is pointed out since PCs have too high a degree of freedom to be used as standardized tools in the company.

In order to reduce the TCO, the IS department of the company must be able to easily integrally control PCs in the company without any troublesome processes. For this purpose, development of a system for remote-controlling PCs from a server is underway. As a method of implementing such system, a desktop PC based on standard interface specifications called DMI (Desktop Management Interface) has been developed.

Recently, IBM Japan has released desktop PCs having functions called "Wake_on_LAN (WOL)" for turning on desktop PCs under the remote control from a server, and "Alert_on_LAN (AOL)" for automatically informing the server of abnormality of each desktop PC.

A typical remote management pattern using the WOL is as follows.

In an environment in which desktop PCs are set on the desks of individual employees as information tools in a company and are connected to a server via a LAN, when software programs installed in the respective desktop PCs are to be upgraded or when data are acquired from the respective desktop PCs, the IS department asks the employees to set their desktop PCs in a WOL enable state when they leave the company on a specific day. At midnight on that day, the server sends a special packet to the desktop PCs to automatically start up OFF or sleeping desktop PCs, thus upgrading the software program or acquiring data therefrom.

In this fashion, when desktop PCs in the company are integrally remote-controlled by a server, the PC maintenance/management cost can be reduced.

However, as the aforementioned WOL function is an automatic wakeup function dedicated to a desktop PC that stores a CPU and LAN controller in a single housing, if that function is directly applied to a note PC, the following problems are posed.

That is, in case of a note PC, it is preferable that a LAN controller be accommodated not in the PC main body but in an expansion unit called a docking station or docking base, and that expansion unit be permanently connected to a LAN in an office. In this way, when the note PC is docked with the expansion unit in the office, it can be used as a desktop PC. On the other hand, when the user leaves the office, he or she can undock the note PC from the expansion unit and can carry it.

However, in such environment in which a CPU and LAN controller can be disconnected from each other, a person other than a given employee may dock his or her own note PC to an expansion unit placed on the desk of that employee and may use it. In such case, the setup state of the LAN controller with the WOL function enabled may be inadvertently initialized by another PC. On the other hand, when a remote access is made by the WOL function, a note PC other than the note PC which is to be accessed is accessed. When this happens, wrong data is acquired from that note PC by a server or data in that note PC is accidentally rewritten.

BRIEF SUMMARY OF THE INVENTION

It is an object of the present invention to provide a computer system which grants use of a LAN controller only in a specific combination of an expansion unit that mounts a LAN controller and a note PC, and can implement highly reliable remote management even in an environment in which a CPU and LAN controller can be disconnected from each other, and a control method of that system.

According to the present invention, a computer comprises: a collating section for, when the computer is connected to an expansion unit having a network control unit, collating an ID peculiar to the computer and an ID peculiar to the expansion unit; and a section for permitting the computer to use the network control unit when the ID peculiar to the computer coincides with the ID peculiar to expansion unit.

According to the present invention, a computer system removably dockable to an expansion unit provided with a network control unit, comprises: a collating section for collating destination unit ID registered in one of the computer system and the expansion unit to which the computer system is docked, with ID peculiar to the other unit; and a section for permitting the computer system to use the network control unit when the destination unit ID registered in one of the computer system and the expansion unit coincides with the ID peculiar to the other unit.

In this computer system, a collation process using registered IDS is made between the computer system and the expansion unit to which the computer system is currently docked. Only when a coincidence between the two IDs is detected by this collation process, the computer system is granted use of the network control unit. Hence, since the network control unit can be used only in a specific combination of the expansion unit and computer main body, highly reliable remote management can be implemented even in an environment in which a CPU and LAN controller can be disconnected from each other.

The collating section executes the ID collation process in response to a wakeup signal generated from the network control unit, and the computer system is set in an operative state accessible from the network when the destination unit ID registered in one of the computer system and the expansion unit coincides with the ID peculiar to the other unit. In this fashion, the computer system can be set in the operative state only when a coincidence between the two IDs is detected. When the two IDs do not coincide with each other, control for returning the computer system to a stop or sleep state before generation of the wakeup signal can be made.

ID registration is implemented by ID registration section for registering an ID peculiar to the expansion unit in the computer main body, or registering an ID peculiar to the computer system in the expansion unit, when the wakeup signal generation function of the network control unit is enabled.

In the computer system of the present invention, first identification data is held in the expansion unit, which indicates whether or not ID registration process by the ID registration section has already been executed between the expansion unit and the computer system, and the ID registration section is provided with a section for determining whether or not the expansion unit has already been made correspondent with other computer system for implementing the wakeup function, by referring to the first identification data held in the expansion unit to which the computer system is docked, and when the expansion unit is made correspondent with other computer system, the ID registration process between the expansion unit and the other computer system is inhibited.

In this way, by determining whether or not the expansion unit has already been made correspondent with the other computer system by the ID registration process, a given expansion unit can be prevented from being made correspondent with a large number of computer systems, or vice versa, i.e., one-to-many combinations can be avoided, and a one-to-one correspondence between the computer systems and expansion units can be maintained.

Note that the computer system main body may hold second identification information indicating whether or not the ID registration process by the ID registration section has already been made, thus also preventing one-to-many combinations.

In the computer system according to the present invention, the expansion unit holds first identification data indicating whether or not the ID registration process by the ID registration section has already been executed, and the computer system holds second identification data indicating whether or not the ID registration process by the ID registration section has already been executed, and the computer system further comprises: a section for determining, in response to a power-on of the computer system, whether or not a combination of the computer system and the expansion unit to which the computer system is docked is the combination of the computer system and the expansion unit both of which ID registration process has not been registered by referring to the first identification data held by the expansion unit to which the computer system is docked and second identification data held by the computer system; and a section for permitting the computer system to use the network control unit on the condition that the destination unit ID registered in one of the computer system and the expansion unit coincides with the ID peculiar to the other unit.

With this arrangement, for example, when the user turns on the computer system which is docked with the expansion unit, whether or not that combination of the computer system and expansion unit is one of those, neither of which have undergone the ID registration process is automatically checked. If such combination is detected, the network control unit can be used. Hence, for example, when the wakeup function of an expansion unit which is commonly used by employees of a given section is disabled, the employees in that section can dock their own note PCs with the expansion unit and can use them as long as they release the wakeup function of their note PCs, thus effectively using hardware resources.

The computer system of the present invention further comprises: a section for determining whether or not a user of the computer system has a predetermined access authority by collating an input password with a password registered in the computer system; and ID registration release means for invalidating a combination of the expansion unit and a specified computer system which are made correspondent by the ID registration process, by rewriting the first identification data held by the expansion unit to which the computer system is docked, in response to a request from the user when the user of the computer system has the predetermined access authority.

When this computer system is started using a supervisor password that verifies a system supervisor, an ID registration release process can be executed independently of coincidence/non-coincidence between the passwords of the computer system and expansion unit, and the first identification data held in the expansion unit can be rewritten. More specifically, when a computer system, which corresponds to a given expansion unit, cannot be identified, or when that computer system is broken, lost, or stolen, that expansion unit and computer system cannot be permanently used. Even in such situation, since the correspondence between those expansion unit and computer can be released using a computer system started by the supervisor password, the expansion unit can be used in combination with another computer system.

According to the present invention, a computer system having a wakeup function for returning to an operative state in response to a wakeup signal generated from a network control unit, comprises: the network control unit being provided in an expansion unit to which a computer system is removably dockable; ID registering section for registering an ID peculiar to the expansion unit in the computer main body and an ID peculiar to the computer main body in the expansion unit, when a wakeup signal generation function of the network control unit is enabled; a section for, in response to the generation of the wakeup signal, collating the ID peculiar to the expansion unit registered in the computer system main body with the ID peculiar to the expansion unit and collating the ID peculiar to the computer system main body with the ID peculiar to the computer system main body registered in the expansion unit; and a section for setting the computer system in an operative state in which an access can be made through the network control unit, when the ID peculiar to the computer system main body registered in the expansion unit coincides with the ID peculiar to the expansion unit registered in the computer system main body, and returning the computer system to a stop or sleep state before generation of the wakeup signal, when the IDS do not coincide with each other.

In this computer system, IDS peculiar to the computer system and expansion unit are registered in each others devices to obtain a one-to-one correspondence between the computer system and expansion unit. When the computer system wakes up from the stop or sleep state in response to a wakeup signal generated by the network control unit, a collation process using the IDS registered in the computer system and expansion unit to which the computer system is currently docked is done so as to check if the current combination is one of computer systems and expansion units, which have been made correspondent with each other by the ID registration process. Only when this collation process detects a coincidence between the ID peculiar to the expansion unit, which is registered in the computer system main body, and the ID peculiar to the expansion unit itself, and a coincidence between the ID peculiar to the computer system main body and the ID peculiar to the computer system, which is registered in the expansion unit, the computer system is set in an operative state in which the computer system is accessible from the network, thus allowing remote accesses.

In this fashion, when peculiar IDs are registered in each others devices, one of the registered IDs can be used instead of the above-mentioned identification data which is used for preventing one-to-many combinations.

According to the present invention, an expansion unit to which a computer system is removably dockable, comprises: a network control unit used for connecting the computer system docked to the expansion unit to a network and having a function of generating a wakeup signal for returning the computer system to an operative state; and a section for storing an ID peculiar to the expansion unit for the collation with an ID of the computer system docked to the expansion unit.

In this manner, when the expansion unit holds its peculiar ID, which is registered in the computer system, the computer system can correspond to the expansion unit.

Also, a method of limiting use of a network control unit using peculiar ID collation and an arrangement that practices the method can also be applied to a computer system which implements an alert function of automatically informing a server of abnormality or the like in the computer system using a network control unit in an expansion unit.

As described above, since a LAN controller can be used only in a specific combination between an expansion unit having the LAN controller and a note PC, highly reliable remote management can be implemented even in an environment in which a CPU and LAN controller can be disconnected from each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the arrangement of a PC and LAN docker according to the first embodiment of the present invention;

FIG. 3 is a flow chart showing the ID registration sequence in the first embodiment;

FIG. 4 is a flow chart showing the PC wakeup control sequence executed when the LAN docker generates a wakeup signal in the first embodiment;

DETAILED DESCRIPTION OF THE INVENTION

Figure 2:
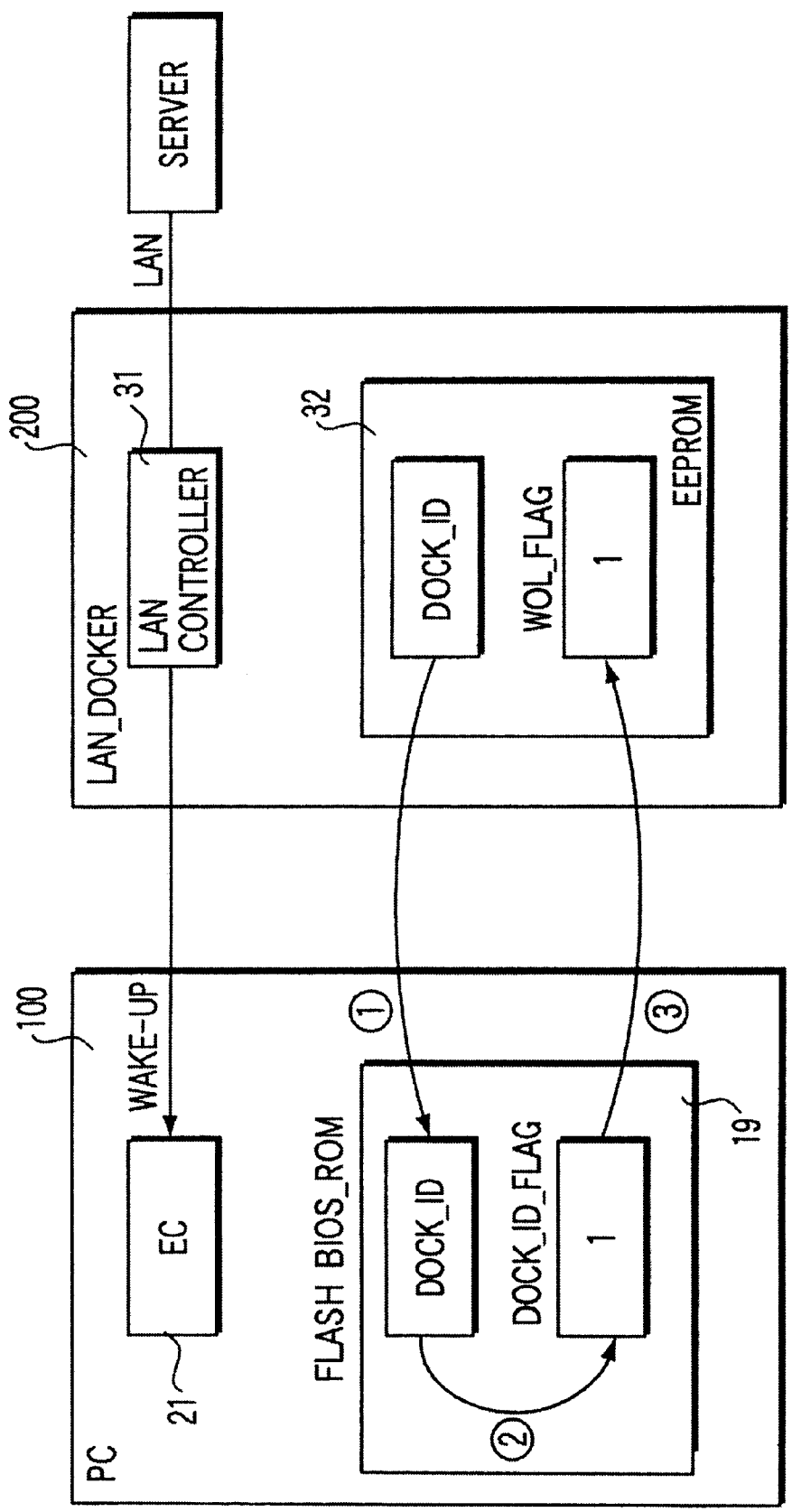
FIG. 2 is a diagram for explaining the principle of ID registration/collation in the first embodiment.

The preferred embodiments of the present invention will be described hereinafter with reference to the accompanying drawings.

FIG. 1 shows the arrangement of a computer system according to an embodiment of the present invention. This computer system is a notebook type personal computer (to be abbreviated as a PC hereinafter) that can be battery-driven, and its PC main body 100 is free to be docked/undocked to/from a LAN docker (LAN_Docker) 200 which serves as an expansion unit for expanding functions. The PC main body 100 and LAN docker 200 are connected via docking connectors 300 provided to them.

The LAN docker 200 includes a LAN controller 31 which communicates with other PCs and a server via a LAN. The LAN controller 31 is compatible with the above-mentioned Wake_on_LAN (WOL) and Alert_on_LAN (AOL) functions. When the WOL function is enabled, the LAN controller 31 generates a wakeup signal Wake_up for automatically turning on the PC main body 100 upon receiving a specific packet from the server via the LAN. When the AOL function is enabled, the LAN controller 31 automatically informs the server of abnormality of the PC main body 100 and status change such as docking/undocking between the PC main body 100 and LAN docker 200 or the like via the LAN.

The LAN docker 200 with the built-in LAN controller 31 is placed on the desk of each employee in, e.g., an office, and is used while it is permanently connected to a LAN cable in the office. Since the LAN controller 31 consumes relatively large power, an AC adapter is used as its operation power supply.

The PC main body 100 is normally used as it is connected to the LAN docker 200 in the office, and is also used outside the office as it is undocked from the LAN docker 200. When the PC main body 100 is undocked from the LAN docker 200, it operates on its built-in batteries or an external power supplied via an AC adapter. On the other hand, when the PC main body 100 is connected to the LAN docker 200, it operates on its built-in batteries or an AC adapter power supplied from the LAN docker 200.

The PC main body 100 includes a PCI bus 1, ISA bus 2, two I$^2$C buses 3 and 4, CPU module 11, main memory 12, VGA controller 13, DVD decoder 14, I/O controller 15, Q switch (Q-SW) 16, PCI interface bridge (PCI I/F) 17, HDD 18, flash BIOS-ROM 19, I/O control gate array (I/O GA) 20, embedded controller (EC) 21, power supply controller (PSC) 22, keyboard controller (KBC) 23, keyboard (KB) 24, and the like, as shown in FIG. 1.

The CPU module 11 executes operation control and data processing of the entire system, and includes a CPU, cache, memory controller for controlling the main memory 12, and the like.

The main memory 12 is used as a main storage of this system, and stores an operating system, an application program to be processed, user data created by the application program, and the like.

The VGA controller 13 controls an LCD or external CRT used as a display monitor of this system.

The I/O controller 15 is a gate array for controlling various I/O devices in the PC main body 100, and controls devices connected to various I/O connectors such as a serial port, parallel port, USB port, and the like provided to the rear surface of the PC main body 100. When the PC main body 100 is connected to the LAN docker 200, signals supplied from the I/O controller 15 to the I/O connectors on the rear surface of the PC main body 100 are passed to those on the rear surface of the LAN docker 200. In this case, the I/O connectors on the rear surface of the PC main body 100 cannot be used since they are covered by the LAN docker 200, but those on the rear surface of the LAN docker 200 can be used instead.

The Q switch (Q-SW) 16 is a switch circuit for connecting/disconnecting the internal PCI bus 1 to/from an external PCI bus of the LAN docker 200, and is ON/OFF-controlled in accordance with a switch control signal Q_SWON from the I/O control gate array (I/O GA) 20. When the Q switch (Q-SW) 16 is turned on, the LAN controller 31 can be used by the PC main body 100.

The PCI interface bridge (PCI I/F) 17 is a gate array implemented by a 1-chip LSI, and includes a bridge function of connecting the PCI bus 1 and ISA bus 2 in two ways, and an IDE controller for controlling the HDD 18. A control line from the IDE controller is also connected to the docking controller 300. When a DVD drive 40 indicated by the broken line in FIG. 1 is mounted on the LAN docker 200, the IDE controller can control that drive.

The flash BIOS-ROM 19 stores a system BIOS, and is comprised of a flash memory that is capable of a program rewrite. The system BIOS systemizes function execution routines for accessing various hardware components in this system, and includes a power management function of setting the system status in an operative state (power ON state), a stop state (power OFF state), or a sleep state (suspend/hibernation state) between these two states, a function of automatically recognizing a change in hardware environment of the system, a management function of the docking condition with the LAN docker 200, and the like.

The management function of the docking condition with the LAN docker 200 is executed to allow use of the above-mentioned WOL/AOL function in a specific combination of a PC main body 100 and LAN docker 200.

More specifically, in this embodiment, when the WOL function of the LAN controller 31 is enabled, a peculiar ID registration process is done to register an ID (Dock_ID) peculiar to the LAN docker 200 in the flash BIOS-ROM 19. Upon generation of a wakeup signal Wake_up from the LAN controller 31, the Dock_ID registered in the flash BIOS-ROM 19 is collated with that of the LAN docker 200, and control as to whether or not the PC main body 100 is set operative is made based on the collation result. Such control using the IDs is a characteristic feature of this embodiment, and will be explained in detail later with reference to FIG. 2 and the subsequent figures.

The I/O control gate array 20 is a bridge LSI that bridges the internal ISA bus 2 and I$^2$C bus 3, and incorporates a plurality of registers that can be read/written by the CPU module 11. Using these registers, the CPU module 11 can communicate with the power supply controller (PSC) 22 and embedded controller (EC) 21 on the I$^2$C buses 3 and 4.

The embedded controller (EC) 21 manages the power supply state of the PC main body 100 in cooperation with the power supply controller (PSC) 22. The embedded controller (EC) 21 and power supply controller (PSC) 22 are kept supplied with power even when the PC main body 100 is turned off and goes to a sleep or stop state. The embedded controller (EC) 21 has a function of controlling the power supply controller (PSC) 22 in response to detection of a generated power ON/OFF event, a function of informing the system BIOS of the generated power ON/OFF event as a power management event, and the like. The embedded controller (EC) 21 has, as functions of controlling the LAN docker 200, a function of detecting docking/undocking between the PC main body 100 and LAN docker 200, a function of controlling power supply to the LAN docker 200, a function of monitoring a wakeup signal from the LAN controller 31, a function of communicating with the LAN controller 31 via the I$^2$C bus 4, and the like.

Docking/undocking between the PC main body 100 and LAN docker 200 is detected using a dock detect signal DOCDET. The dock detect signal DOCDET indicates the voltage value of a predetermined pin of the docking connector 300, and goes low when the PC main body 100 is connected to the LAN docker 200.

Power supply control of the LAN docker 200 is done using a dock power ON signal DOCPWON and wake-on-LAN enable signal WOLEN.

The dock power ON signal DOCPWON is a power supply ON signal sent from the EC 21 in the PC main body 100 to the LAN docker 200 side. When the dock power ON signal DOCPWON is activated, the power supply of the LAN docker 200 is turned on.

The dock power ON signal DOCPWON is activated when:

1) docking of the PC main body 100 to the LAN docker 200 is detected based on the dock detect signal DOCDET; or
2) the power supply of the PC main body 100 is turned on in the docking state (including power ON upon operation of the power switch, and power ON in response to the wakeup signal Wake_up).

The dock power ON signal DOCPWON is inactivated when:

1) undocking of the PC main body 100 is detected based on the dock detect signal DOCDET;
2) the power supply of the PC main body 100 is turned off in the docking state; or
3) the system BIOS instructs to turn off the dock power ON signal DOCPWON.

Using this dock power ON signal DOCPWON, the LAN docker 200 can be ON/OFF-controlled in cooperation with docking/undocking and power ON/OFF of the PC main body 100.

The wake-on-LAN enable signal WOLEN determines whether or not the LAN docker 200 is maintained ON, when the dock power ON signal DOCPWON is inactivated upon power OFF of the PC main body 100 or undocking of the PC main body 100, and is sent from the I/O control gate array 20 in the PC main body 100 to the LAN docker 200 side.

When the WOL/AOL function of the LAN controller 31 is enabled, the system BIOS enables the wake-on-LAN enable signal WOLEN. Consequently, the LAN controller 31 is kept supplied with power, and even when the PC main body 100 is turned off and is set in a sleep or stop state, the LAN controller 31 can communicate with the server. After a switch circuit 34 provided to the LAN docker 200 holds an ON state in response to the signal WOLEN, it maintains the ON state even after the signal WOLEN is disabled. Hence, even when the PC main body 100 is turned off after the WOL function is enabled and is undocked from the LAN docker 200, power supply to the LAN controller 31 is maintained.

Note that a signal PCONF supplied from the LAN docker 200 side to the EC 21 is used for confirming whether or not the LAN controller 31 is ON.

As the LAN docker 200, a first type docker that mounts the DVD drive 40, and a second type docker that does not mount any DVD drive 40 are available. Either type of LAN dockers 200 includes an EEPROM 32, a power supply circuit 33, a switch circuit 34, an electromagnetic lock mechanism 35, and a drive circuit 36 in addition to a LAN controller 31 as described above.

The EEPROM 32 stores PnP information required for implementing a plug-and-play function such as attribute information of the LAN docker 200, that of the LAN controller 31 built in the LAN docker 200, and the like. The attribute information of the LAN docker 200 includes an ID peculiar to that LAN docker 200. When the WOL/AOL function is enabled, the peculiar ID of the LAN docker 200 is read out from the EEPROM 32 by the system BIOS and is saved in the flash BIOS-ROM 19.

The power supply circuit 33 generates an internal power for the LAN docker 200 from an AC adapter power supply. A power for the LAN controller 31 is supplied from the power supply circuit 33 to the LAN controller 31 via the switch circuit 34. The switch circuit 34 is controlled by the power supply control signal DOCPWON supplied from the PC main body 100 side. The switch circuit 34 is turned on when the signal DOCPWON is active, thus supplying power to the LAN controller 31. When the signal DOCPWON is inactive, the switch circuit 34 is turned off, thus cutting off power supply to the LAN controller 31. Note that the switch circuit 34 includes a state holding circuit, and holds the ON state until the next activation timing of the signal DOCPWON, if the signal WOLEN is active when the signal DOCPWON changes from active to inactive.

The lock mechanism 35 locks the PC main body 100 docked with the LAN docker 200 to prevent it from being ejected from the LAN docker 200. More specifically, the lock mechanism 35 locks the PC main body 100 while a solenoid is being energized by the drive circuit 36. The solenoid is energized by the drive circuit 36 during the period in which the PC main body 100 can use the LAN controller 31, i.e., only the period in which the signal DOCPWON is maintained active. This is to prevent operation errors that may take place upon ejecting the PC main body 100 during the use of the LAN controller 31.

The docking management function using ID collation will be explained below with reference to FIG. 2.

When the WOL function of the LAN controller 31 is enabled, the following ID registration process is done in that setup process.

1) The peculiar ID (Dock_ID) of the LAN docker 200 is read out from the EEPROM 32 of the LAN docker 200, and is registered in the data area of the flash BIOS-ROM 19 of the PC main body 100 as the peculiar ID of the docking partner. 2) A dock ID flag (Dock_ID_FLAG) prepared in the data area of the flash BIOS-ROM 19 is set at "1". The dock ID flag (Dock_ID_FLAG) indicates whether or not the peculiar ID of the docking partner has been registered, and Dock_ID_FLAG=1 indicates that the peculiar ID of the docking partner has been registered, in other words, the PC main body 100 corresponds to the LAN docker 200 to implement the WOL function, and the WOL function of the PC main body 100 is enabled.

After that, 3) a wake-on-LAN flag (WOL_FLAG) held in the EEPROM 32 of the LAN docker 200 is set at "1". The wake-on-LAN flag (WOL_FLAG) indicates whether or not the ID (Dock_ID) peculiar to the LAN docker 200 has been registered in the PC main body as the docking partner, and WOL_FLAG="1" indicates that Dock_ID has been registered in the PC main body as the docking partner, or the PC main body 100 corresponds to the LAN docker 200 to implement the WOL function, and the WOL function of the LAN docker 200 is enabled.

When the WOL function is enabled, the aforementioned wake-on-LAN enable signal WOLEN is enabled. In this manner, after the power supply of the PC main body 100 is turned off, the LAN controller 31 is kept powered.

Upon receiving a specific packet from the server, the LAN controller 31 issues a wakeup signal Wake_up to the PC main body 100. The EC 21 of the PC main body 100 is kept ON. Upon receiving the wakeup signal Wake_up, the EC 21 informs the power supply controller (PSC) 22 of that signal to make the controller 22 turn on the power supply of the PC main body 100 and begin to supply a minimum required power required for starting up the system BIOS. At the same time, the EC 21 generates a dock power ON signal DOCPWON.

The system BIOS reads out the ID (Dock_ID) peculiar to the LAN docker 200 from its EEPROM 32 to check if the current combination of the PC main body 100 and LAN docker 200 has their IDs registered, and compares the readout Dock_ID with Dock_ID registered in the flash BIOS-ROM 19. If the two IDs do not coincide with each other, the system BIOS turns off the power supply of the PC main body 100, and resets its system status to a state (suspend/hibernation/stop state) before generation of the wakeup signal Wake_up. On the other hand, if the two IDs coincide with each other, the system BIOS turns on the Q switch 16, executes a return process from the suspend/hibernation state or starts up the OS, and passes control to the OS. In this fashion, the PC main body 100 can be accessed from the server via the network using the LAN controller 31.

As described above, in this embodiment, since collation using peculiar IDs is made, remote control using the WOL can be done in only a specific combination of LAN docker 200 and PC main body 100.

FIG. 3 shows the ID registration sequence in detail.

The system BIOS checks the dock ID flag (Dock_ID_FLAG) in the flash BIOS-ROM 19 and wake-on-LAN flag (WOL_FLAG) held in the EEPROM 32 of the LAN docker 200. If one of Dock_ID_FLAG and WOL_FLAG is "1" (YES in step S101 or S102), the system BIOS notifies the user of the PC main body 100 of an error, and interrupts the ID registration process (step S106).

On the other hand, if both Dock_ID_FLAG and WOL_FLAG are "0" (NO in steps S101 and S102), the system BIOS determines that the current combination of PC main body 100 and LAN docker 200 is one which does not have IDs registered, and starts the following ID registration.

The system BIOS reads out an ID (Dock_ID) peculiar to the LAN docker 200 from the EEPROM 32 of the LAN docker 200, and registers the readout ID in the data area of the flash BIOS-ROM 19 of the PC main body 100 as a peculiar ID of the docking partner (step S103). Subsequently, the system BIOS sets a dock ID flag (Dock_ID_FLAG) prepared in the data area of the flash BIOS-ROM 19 at "1", and also sets a wake-on-LAN flag (WOL_FLAG) held in the EEPROM 32 of the LAN docker 200 at "1" (steps S104 and S105). While the LAN docker 200 and PC main body 100 correspond to each other in this manner, a process (WOL registration process) for enabling the WOL functions of both the PC main body 100 and LAN docker 200 is executed.

In this fashion, upon enabling the WOL function, control for permitting/inhibiting execution of the ID registration process is made using the wake-on-LAN flag (WOL_FLAG) and dock ID flag (Dock_ID_FLAG) by the ID registration process. With this control, a one-to-many combinations can be prevented, that is, a given LAN docker can be prevented from corresponding to a plurality of PC main bodies or vice versa, thus always maintaining a one-to-one relationship in a combination between a PC main body and LAN docker that implement WOL.

FIG. 4 shows the process of the system BIOS executed in response to a wakeup signal Wake_up supplied from the LAN controller 31.

When the power supply of the PC main body 100 is turned on in response to a wakeup signal Wake_up from the LAN controller 31, the system BIOS reads out an ID (Dock_ID) peculiar to the LAN docker 200 to which the PC main body 100 is docked from the EEPROM 32 of that LAN docker 200 (step S111), and compares the readout Dock_ID with Dock_ID registered in the flash BIOS-ROM 19 (step S112). If the two IDs coincide with each other, the system BIOS determines that the current combination of PC main body 100 and LAN docker 200 is one of those that have corresponded to each other by the ID registration process, turns on the Q switch 16, sets the system in an operative state by executing a return process from a suspend/hibernation state, an OS startup process, and the like, and passes control to the OS (step S113). In this way, the PC main body 100 is accessible from the server via the network using the LAN controller 31.

On the other hand, if the Dock_ID of the LAN docker 200 does not coincide with the Dock_ID registered in the flash BIOS-ROM 19, the system BIOS inactivates a dock power ON signal DOCPWON, turns off the power supply of the PC main body 100, and returns its system status to a state (suspend/hibernation/stop state) before generation of the wakeup signal Wake_up (step S114).

Figure 5:
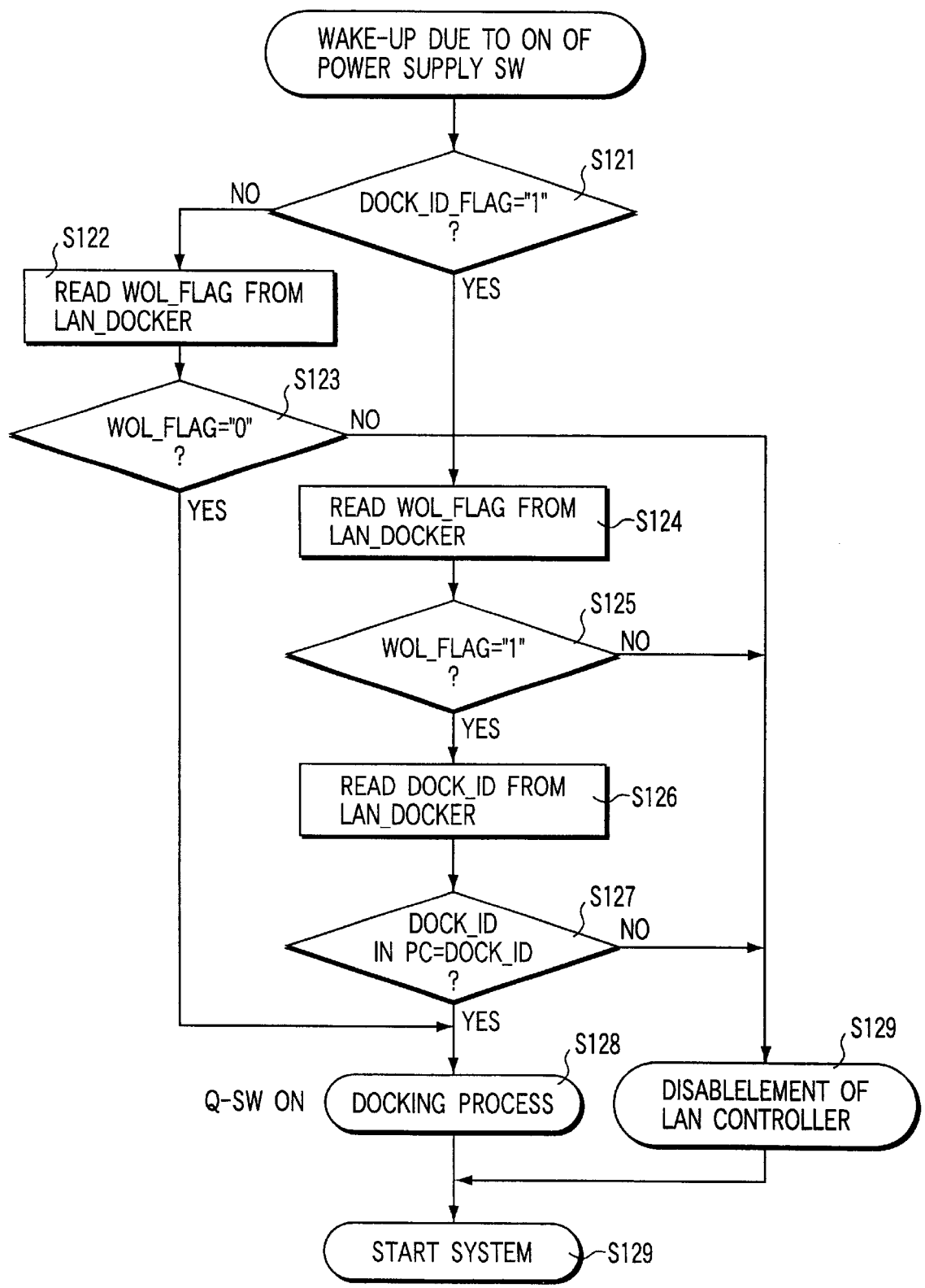
FIG. 5 is a flow chart showing the wakeup control sequence when a PC wakes up in response to an event other than the wakeup signal generated by the LAN docker in the first embodiment.

FIG. 5 shows the process of the system BIOS executed when the power supply of the PC main body 100 is turned on in response to an event other than the wakeup signal Wake_up from the LAN controller 31.

When it is detected based on the dock detect signal DOCDET that the user has turned on the power switch of the PC main body 100 or connects the PC main body 100 to the LAN docker 200, the dock power ON signal DOCPWON is generated to turn on the power supply of the LAN docker 200, and to wake up the PC main body 100 from the current sleep or OFF state, thus executing the system BIOS.

The system BIOS refers to the value of the dock ID flag (Dock_ID_FLAG) in the flash BIOS-ROM 19 to check if the PC main body 100 corresponds to the predetermined LAN docker 200 to enable the WOL function (step S121).

If Dock_ID_FLAG="0", the system BIOS determines that the WOL function of the PC main body 100 is not enabled and does not correspond to any LAN docker. The system BIOS refers, in turn, to the wake-on-LAN flag (WOL_FLAG) of the currently attached LAN docker 200 to check if that LAN docker 200 corresponds to another PC to enable the WOL function (steps S122 and S123). If WOL_FLAG ="0", i.e., if the WOL function is not enabled and that LAN docker does not correspond to any PC, the system BIOS determines that the WOL functions of the current combination of PC main body 100 and LAN docker 200 are not enabled and this combination has not gone through ID registration. Then, the system BIOS starts the above-mentioned docking process including processes for turning on the Q switch 16, and the like (step S128), so that the LAN controller 31 can be used. After that, the system BIOS executes a system startup process such as a return process from the suspend/hibernation state, an OS startup process, or the like to set the system state in the operative state, and passes control to the OS (step S130).

On the other hand, if WOL_FLAG="1" is detected in step S123, since the LAN docker to which the PC main body 100 is currently docked already corresponds to another PC, the system BIOS does not execute the docking process, and executes the system startup process in step S130 while inhibiting the LAN controller 31 from being used, i.e., determining that the PC main body is not docked with any LAN docker (step S129). In this case, since the dock power ON signal DOCPWON is inactivated, the power supply of the LAN controller 31 is turned off, and the Q switch 16 is kept OFF. As a result, the PC main body 100 cannot use the LAN controller 31, but can use the serial port, parallel port, USB port, and DVD drive 40 provided to the LAN docker 200 as usual.

Also, if Dock_ID_FLAG="1" is detected in step S121, the system BIOS refers to the wake-on-LAN flag (WOL_FLAG) of the LAN docker 200 to check if that LAN docker 200 corresponds to some PC to enable the WOL function (steps S124 and S125).

If WOL_FLAG="0", since a LAN docker to which the PC main body 100 corresponds does not coincide with the current LAN docker, the system BIOS does not execute any docking process, and executes the system startup process in step S130 while inhibiting the LAN controller 31 from being used, i.e., determining that the PC main body is not docked with any LAN docker (step S129).

On the other hand, if WOL_FLAG="1" is detected in step S125, the system BIOS reads out the ID (Dock_ID) peculiar to the LAN docker 200 docked with the PC main body 100 from the EEPROM 32 of that LAN docker 200 (step S126), and compares the readout Dock_ID with Dock_ID registered in the flash BIOS-ROM 19 (step S127). If the two IDs coincide with each other, the system BIOS executes the docking process in step S128, and then executes the system startup process in step S130. On the other hand, if it is detected in step S127 that the two IDs do not coincide with each other, since the apparatuses correspond to different partners, the system BIOS does not execute any docking process, and executes the system startup process in step S130 while inhibiting the LAN controller 31 from being used, i.e., determining that the PC main body is not docked with any LAN docker (step S129).

Figure 6:
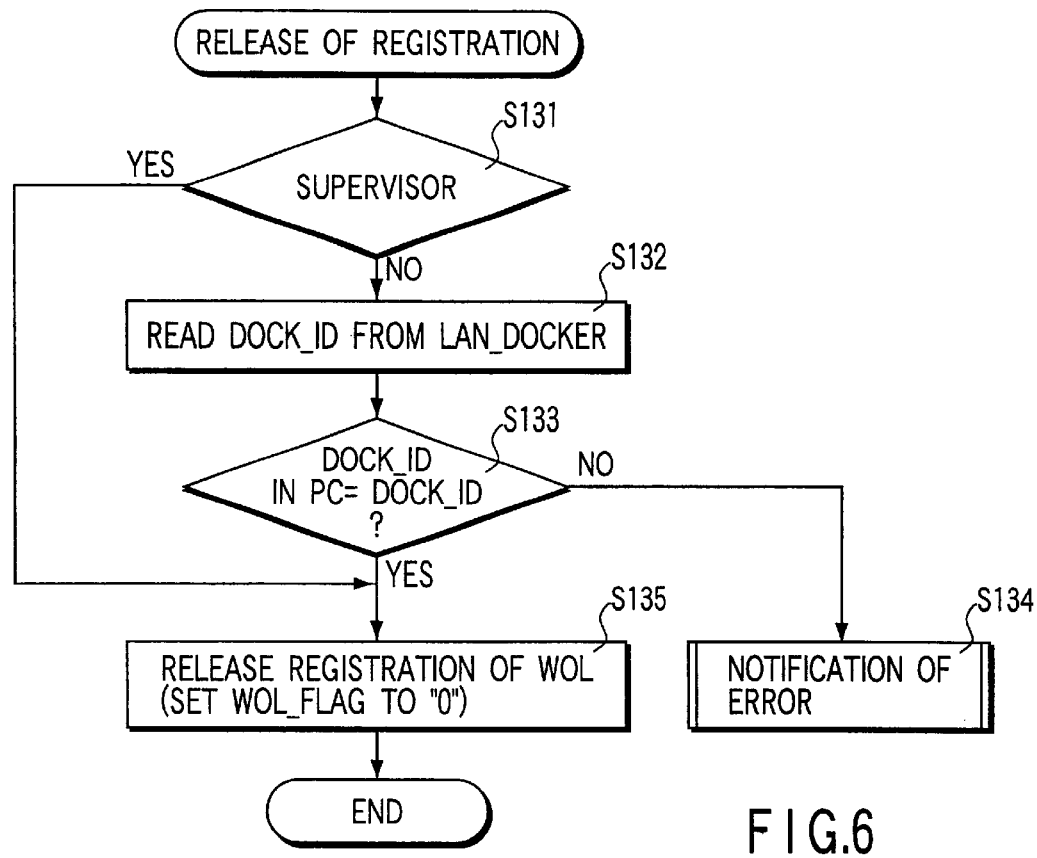
FIG. 6 is a flow chart showing the ID registration release sequence used in the first embodiment.

FIG. 6 shows the ID registration release sequence executed by the system BIOS.

When the user of the PC main body 100 requests an ID registration release process, the system BIOS checks if that PC main body 100 has been started by a supervisor password (step S131). More specifically, the system BIOS has a function of collating a password input upon starting the PC main body 100 with the supervisor password registered in advance in the PC main body 100 to check if the user of the PC main body 100 is a supervisor having a predetermined access authority. When the PC main body 100 has been started using the supervisor password, the docking process described above in step S128 in FIG. 5 is executed irrespective of coincidence/non-coincidence between the IDs, and the system is started in a state wherein the LAN controller 31 can be used. In this way, when the PC main body 100 is started using the supervisor password, and the user of that PC main body 100 requests an ID registration release process, the system BIOS sets both the wake-on-LAN flag (WOL_FLAG) and dock ID flag (Dock_ID_FLAG) at "0", thus invalidating the registered ID and disabling the WOL setups (step S135).

On the other hand, if the PC main body is started not using the supervisor password, the system BIOS reads out, an ID (Dock_ID) peculiar to the LAN docker 200 to which the PC main body 100 is docked, from the EEPROM 32 of that LAN docker 200 (step S132), and compares the readout Dock_ID with the Dock_ID registered in the flash BIOS-ROM 19 (step S133). If the two IDs coincide with each other, the ID registration release process is executed in step S135; otherwise, the system BIOS informs the user of an error (step S134).

In this way, when the PC main body is started using the supervisor password, the processing for releasing the registered ID can be executed irrespective of coincidence/non-coincidence between the IDs. Hence, even when a PC, which corresponds to a given LAN docker 200, cannot be identified, or when that PC is broken, lost, or stolen, the correspondence between that LAN docker 200 and another PC can be released using the PC that has been started using the supervisor password.

In this embodiment, the ID peculiar to the LAN docker 200 is registered in the PC main body 100. Alternatively, the ID peculiar to the PC main body 100 may be registered in the LAN docker 200 to obtain the same effect.

The second embodiment of the present invention will be described below.

Figure 7:
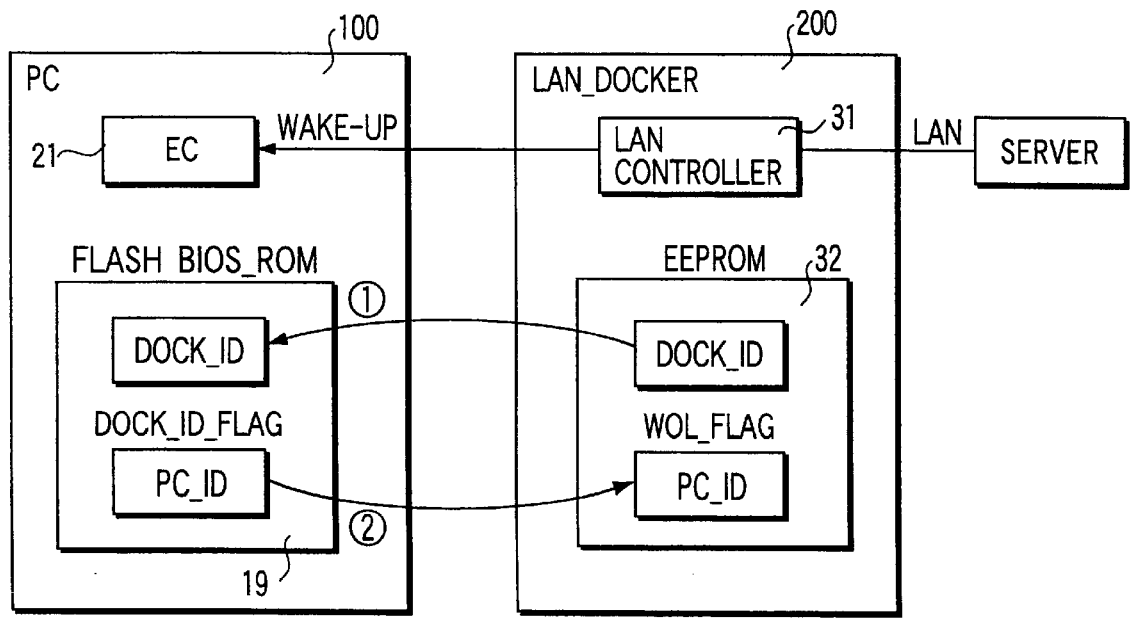
FIG. 7 is a diagram for explaining the principle of ID registration/collation according to the second embodiment of the present invention.

The principle of a docking management method used in the second embodiment will be explained first with reference to FIG. 7.

The first embodiment uses the dock ID flag (Dock_ID_FLAG) and wake-on-LAN flag (WOL_FLAG) to prevent one-to-many combinations of the PC main body 100 and LAN docker 200. However, the second embodiment uses a method of recording each others peculiar IDs in partner apparatuses between the PC main body 100 and LAN docker 200 in place of these flags.

More specifically, upon enabling the WOL function of the LAN controller 31, the following ID registration process is executed in its setup processes.

1) An ID (Dock_ID) peculiar to the LAN docker 200 is read out from the EEPROM 32 of the LAN docker 200, and is registered as a peculiar ID of a docking partner in the data area of the flash BIOS-ROM 19 of the PC main body 100.

2) An ID (PC_ID) peculiar to the PC main body 100, which is held by the flash BIOS-ROM 19, is then registered in the EEPROM 32 of the LAN docker 200.

When the LAN controller 31 generates a wakeup signal Wake_up, the system BIOS authenticates the Dock_ID of the LAN docker 200 and Dock_ID in the PC main body 100, and the PC_ID of the PC main body 100 and PC_ID in the LAN docker 200, between the PC main body 100 and LAN docker 200. Only when the two sets of IDS coincide with each other, the system BIOS turns on the Q switch 16, sets the system state in an operative state, and passes control to the OS. With this control, the PC main body 100 is accessible from the server via the network using the LAN controller 31.

In this fashion, when the own peculiar IDS are registered in each others apparatuses, one of the registered IDs can be used in place of the aforementioned flags used for avoiding one-to-many combinations.

More specifically, when the ID peculiar to the LAN docker 200 is simply registered in the PC main body 100, the peculiar ID of a single LAN docker 200 may be registered in a plurality of PC main body 100 unless ID registration limitation using flags described above with reference to FIG. 3 is made, i.e., one-to-many combinations may be formed. Likewise, when the ID peculiar to the PC main body 100 is simply registered in the LAN docker 200, the peculiar ID of a given PC main body 100 is recorded in a plurality of LAN dockers 200, i.e., one-to-many combinations are formed, unless registration limitation using flags described above with reference to FIG. 3 is made.

When the own peculiar IDs are registered in the partner apparatuses between the PC main body and LAN docker 200 and Dock_IDs and PC_IDs are collated upon waking up as in the second embodiment, one-to-many combinations can be easily prevented.

Figure 8:
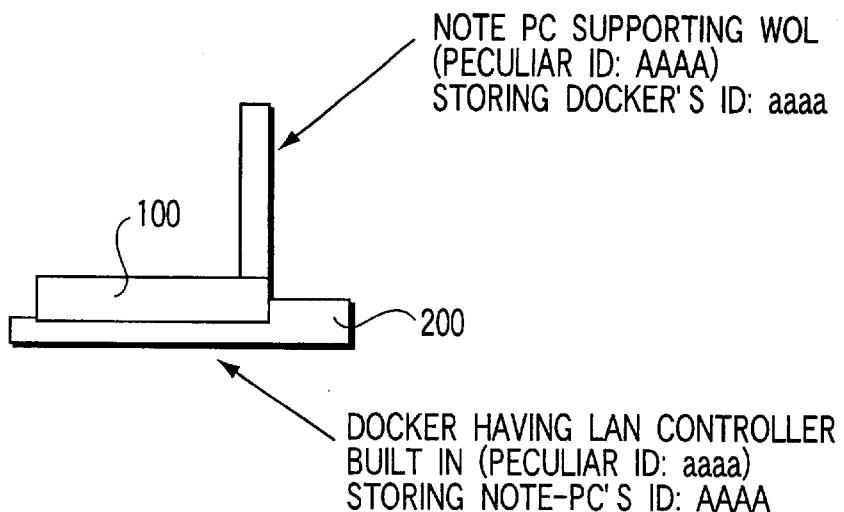
FIG. 8 is a view for explaining IDs respectively registered in a PC and LAN docker in the second embodiment.

FIG. 8 shows the state wherein the PC main body 100 is connected to the LAN docker 200. Upon enabling WOL, the peculiar ID (peculiar ID=AAAA) of the PC main body 100 is saved in the LAN docker 200, and the peculiar ID (peculiar ID=aaaa) of the LAN docker 200 is also saved in the PC main body 100.

Figure 9:
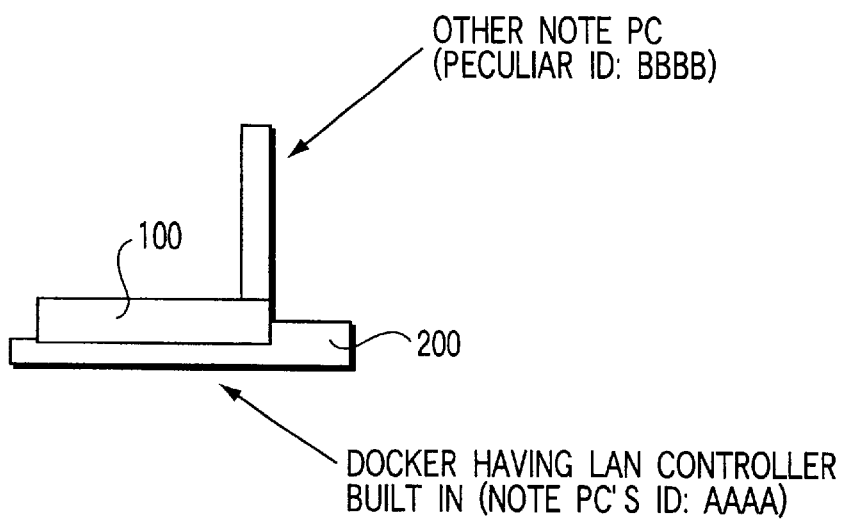
FIG. 9 is a view for explaining an example in which the combination of PC and LAN docker is different from that upon ID registration in the second embodiment.

FIG. 9 shows the state wherein a PC main body (peculiar ID=BBBB) having a peculiar ID different from that in FIG. 8 is connected to the LAN docker 200 (storing the peculiar ID=AAAA of the PC main body) shown in FIG. 8. In this case, since the peculiar ID (AAAA) of the PC main body stored in the LAN docker 200 does not coincide with the peculiar ID (BBBB) of the PC main body 100 currently connected to the LAN docker 200, even when the LAN controller 31 generates a wakeup signal Wake_up, the PC main body 100 does not operate, and returns to a state before generation of the wakeup signal Wake_up. When the power switch of the PC main body 100 is turned on, the system startup process of the PC main body 100 is executed while inhibiting the LAN controller 31 of the LAN docker 200 from being used.

Figure 10:
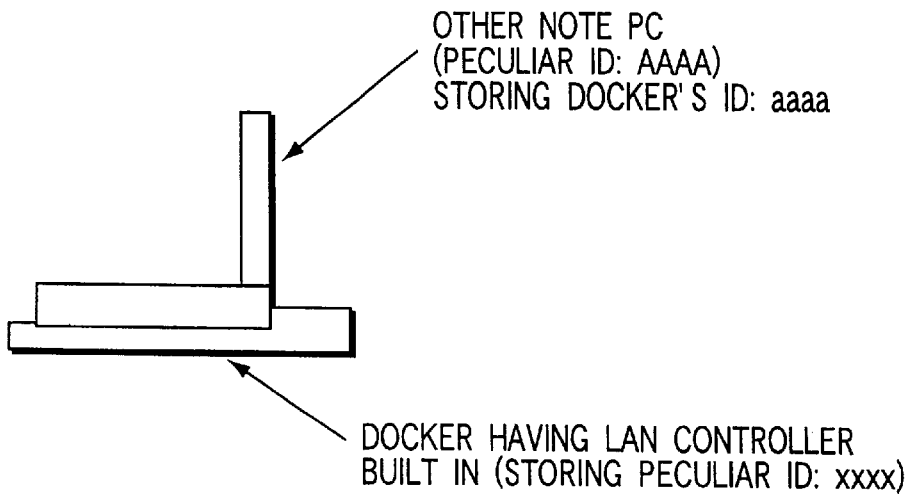
FIG. 10 is a view for explaining another example in which the combination of PC and LAN docker is different from that upon ID registration in the second embodiment.

FIG. 10 shows the state wherein the PC main body 100 (storing the peculiar ID=aaaa of the LAN docker) shown in FIG. 8 is connected to a LAN docker (peculiar ID=xxxx) having a peculiar ID different from that in FIG. 8. In this case, since the peculiar ID (aaaa) of the LAN docker stored in the PC main body 100 does not coincide with the peculiar ID (xxxx) of the LAN docker to which the PC main body 100 is currently connected, even when the LAN controller 31 generates a wakeup signal Wake_up, the PC main body 100 does not operate, and returns to a state before generation of the wakeup signal Wake_up. When the power switch of the PC main body 100 is turned on, the system startup process of the PC main body 100 is executed while inhibiting the LAN controller 31 of the LAN docker 200 from being used.

Figure 11:
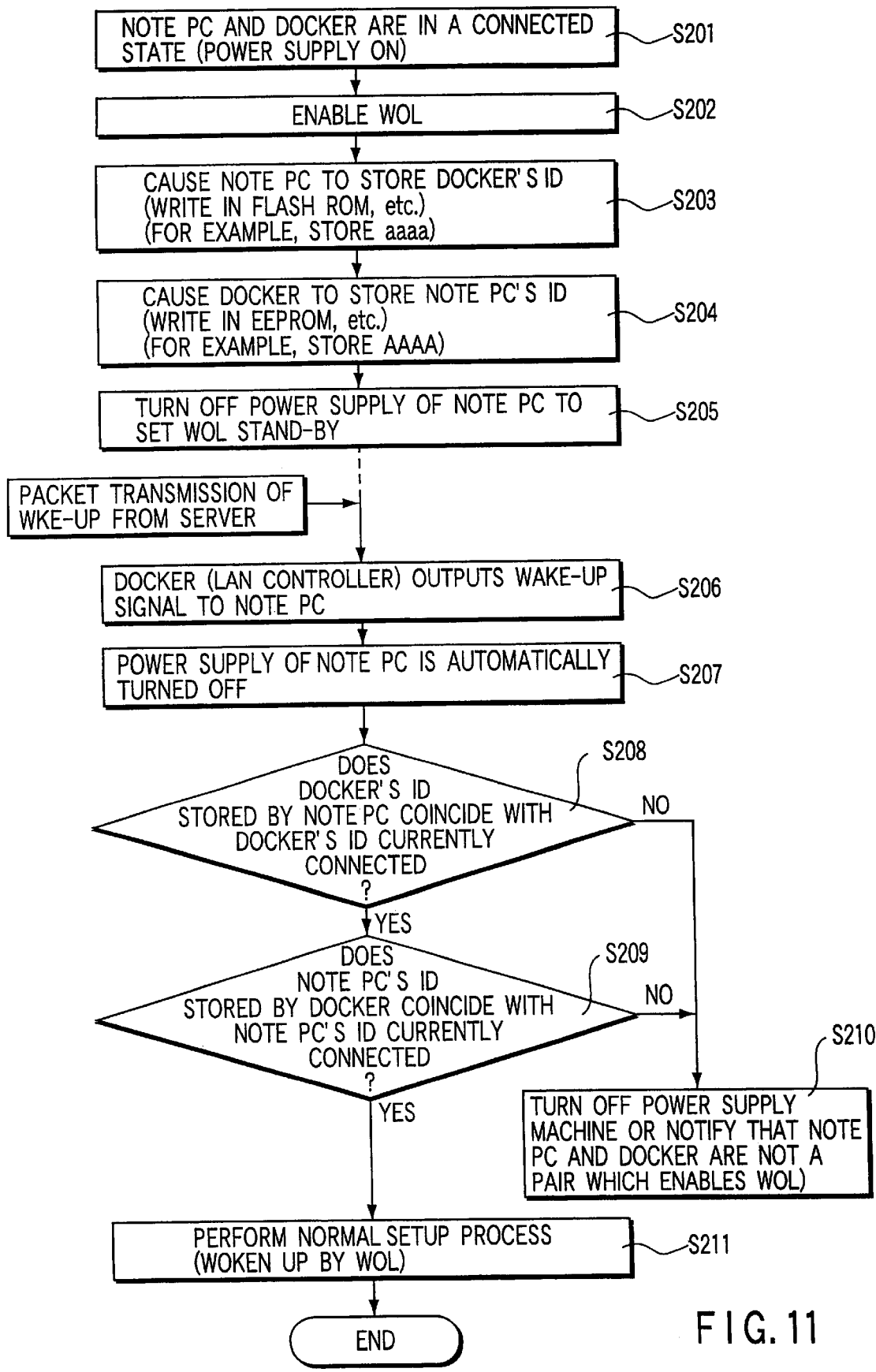
FIG. 11 is a flow chart showing the sequence of overall WOL control in the second embodiment.

FIG. 11 shows the sequence of the entire WOL control in the second embodiment.

Setups for enabling WOL are made while the PC main body 100 is docked to the LAN docker 200 (steps S201 and S202). At this time, the peculiar ID of the LAN docker 200 is stored in the PC main body 100, and that of the PC main body 100 is stored in the LAN docker 200 (steps S203 and S204). Then, the power supply of the PC main body 100 is turned off (step S205). Even when the PC main body 100 is set in the stop or sleep state (suspend or hibernation state) by turning off the power supply of the PC main body 100, the LAN controller 31 is maintained in a power ON state by the above-mentioned wake-on-LAN enable signal WOLEN.

Upon receiving a specific packet from the server, the LAN controller 31 generates a signal Wake_up (step S206). In response to this signal, the power supply of the PC main body 100 is automatically turned on, and the PC main body 100 wakes up from the stop or sleep state (step S207). The system BIOS collates the ID of the LAN docker stored in the PC main body 100 with the ID of the currently connected LAN docker (step S208). If the two IDs do not coincide with each other, the power supply of the PC main body 100 is turned off, and the PC main body 100 returns to the stop or sleep state before generation of the signal Wake_up (step S210).

If the ID of the LAN docker stored in the PC main body 100 coincides with the ID of the currently connected LAN docker, the system BIOS collates, in turn, the ID of the PC main body with the ID of the PC main body stored in the currently connected LAN docker (step S209). If the two IDs coincide with each other, the Q switch 16 is turned on, and a return process from the suspend or hibernation process or OS startup process is executed (step S211); otherwise, the power supply of the PC main body 100 is turned off, and the PC main body 100 returns to the stop or sleep state before generation of the signal Wake_up in step S210.

In the second embodiment as well, whether or not a specific combination of PC main body 100 and LAN docker 200 has not gone through ID registration one can be determined by checking if they hold each others IDs. Hence, as in the process executed upon power ON in the first embodiment described above with reference to FIG. 5, if a combination of PC main body and LAN docker, the IDs of which are not registered, is detected, a state wherein the LAN controller 31 can be used can be set. As in the registration release process of the first embodiment described above with reference to FIG. 6, the registered IDs may be released by starting up the PC using a supervisor password.

In the above description, ID collation is made when the WOL functions of both the PC main body and LAN docker are enabled. ID collation is preferably made when the AOL functions of both the PC main body and LAN docker are enabled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer, that is removably dockable to an expansion unit having a network control unit, the computer comprising:

means for collating an ID of the computer and an ID of the expansion unit in response to a wakeup signal generated from the network control unit; and means for permitting the computer to use the network control unit when the ID of the computer coincides with the ID of the expansion unit.

2. The computer according to claim 1, wherein one of the ID of the computer and the ID of the expansion unit is registered in one of the computer and the expansion unit, and the computer is set in an operative state from the network when the ID registered in one of the computer and the expansion unit coincides with an ID of the other of the computer and the expansion unit.

3. The computer according to claim 2, further comprising:

ID registration means for registering the ID of the other of the computer and the expansion unit into one of the computer and the expansion unit to which the computer is connected, when a wakeup signal generating function of the network control unit is set to enabled.

4. The computer according to claim 3, wherein first identification data is held in the expansion unit, which indicates whether an ID registration process by the ID registration means has already been executed between the expansion unit and the computer;

the ID registration means includes means for determining whether the expansion unit has already been made correspondent with another computer by referring to the first identification data held in the expansion unit to which the computer is docked; and when the expansion unit has already been made correspondent with another computer, the ID registration process between the expansion unit and the computer is inhibited.

5. The computer according to claim 3, wherein the computer holds second identification data indicating whether the ID registration process by the ID registration means has already been executed;

the ID registration means includes means for determining whether another expansion unit exists which has already been made correspondent with the computer by referring to the second identification data held by the computer; and when another expansion unit already made correspondent with the computer exists, the execution of the ID registration process between the computer and the expansion unit to which the computer is connected is inhibited.

6. The computer according to claim 3, wherein the expansion unit holds first identification data indicating whether the ID registration process by the ID registration means has already been executed, and the computer holds second identification data indicating whether the ID registration process by the ID registration means has already been executed;

and further comprising:

means for determining, in response to a power-on of the computer, whether neither the computer nor the expansion unit to which the computer is docked have been registered with each other by the ID registration process by referring to the first identification data held by the expansion unit to which the computer is docked and second identification data held by the computer;

means for permitting the computer to use the network control unit on the condition that the ID registered in one of the computer and the expansion unit corresponds to the ID of the other unit.

7. The computer according to claim 3, wherein the ID registration means reads the ID of the expansion unit to which the computer is docked and registers the ID in the computer as a destination unit ID; and the collating means reads the ID of the expansion unit to which the computer is docked and collates the read ID with the destination unit ID held in the computer.

8. The computer according to claim 4, further comprising:

means for determining whether a user of the computer has a predetermined access authority by collating an input password with a password registered in the computer; and ID registration release means for invalidating a combination of the expansion unit and a specified computer previously registered by the ID registration process, by rewriting the first identification data held in the expansion unit to which the computer is docked, in response to a request from the user when the user of the computer has the predetermined access authority.

9. A computer having a wakeup function for returning to an operative state in response to a wakeup signal generated from a network control unit, comprising:

a network accessible through an expansion unit to which the computer is removably dockable;

ID registering means for registering an ID of the expansion unit in the computer and an ID of the computer in the expansion unit, when the wakeup function of the network control unit is enabled;

means for, in response to generation of the wakeup signal, collating the ID of the expansion unit registered in the computer with the ID of the expansion unit and collating the ID of the computer with the ID of the computer registered in the expansion unit; and means for setting the computer to an operation state in which network access can be made through the network control unit, when the ID of the computer registered in the expansion unit coincides with the ID of the expansion unit registered in the computer.

10. A control method of a computer removably dockable to an expansion unit provided with a network control unit, the method comprising the steps of:

collating one of an ID of the computer and an ID of the expansion unit, which is registered in one of the computer and the expansion unit, with an ID of the other of the computer and the expansion unit in response to a wakeup signal generated from the network control unit; and permitting the computer to use the network control unit when the ID of one of the computer and the expansion unit coincides with the ID of the other of the computer and the expansion unit.

11. The method according to claim 10, further comprising:

setting the computer in an operation state in which an access to a network can be made through the network control unit.

12. The method according to claim 11, further comprising:

registering one of the ID of the computer and the ID of the expansion unit in the other as a destination unit ID, when the wakeup signal is generated.

13. The method according to claim 12, further comprising the steps of:

storing first identification data in the expansion unit indicating whether one of the ID of the expansion unit and the ID of the computer has been registered;

referring, by the computer, to the first identification data stored in the expansion unit to determine whether the expansion unit has already been registered with another computer; and inhibiting the expansion unit from being registered when the expansion unit has already been registered with another computer.

14. The method according to claim 12, further comprising the steps of:

storing second identification data in the computer indicating that the expansion unit has been registered;

referring to the second identification data stored in the computer to determine whether an expansion unit has already been registered with the computer; and inhibiting a new expansion unit from being registered when an expansion unit has already been registered with the computer.

15. The method according to claim 12, further comprising the steps of:

storing, in the expansion unit, first identification data indicating whether the ID of the computer has been registered;

storing, in the computer, second identification data indicating whether the ID of the expansion unit has been registered;

referring, in response to power on of the computer, to the first identification data stored in an expansion unit to which the computer is docked and the second identification data stored in the computer to determine whether the computer and the expansion unit to which the computer is docked have been registered with each other; and permitting the computer to use the network control unit on the condition that one of the computer and the expansion unit has been registered with the other.

16. The method according to claim 12, wherein the registering step includes:

reading an ID from the expansion unit to which the computer is docked; and registering the read ID in the computer as the destination unit ID; and wherein the collating step includes:

reading an ID from the expansion unit to which the computer is docked; and collating the read ID with the destination unit ID registered in the computer.

17. The method according to claim 13, further comprising the steps of:

determining whether a user of the computer has a predetermined access authority by collating an inputted password with a password registered in the computer; and invalidating a previously registered pair of the expansion unit and a specified computer, by rewriting the first identification data stored in the expansion unit to which the computer is docked in response to a request from the user when the user of the computer has the predetermined access authority.

18. A control method of a computer having a wakeup function for returning to an operative state in response to a wakeup signal generated from a network control unit, the method comprising the steps of:

registering an ID of an expansion unit in the computer and an ID of the computer in the expansion unit, when the wakeup signal is generated;

collating, in response to generation of the wakeup signal, the ID of the expansion unit registered in the computer with the ID of the expansion unit, and the ID of the computer with the ID of the computer registered in the expansion unit; and setting the computer in an operative state that permits the computer to access a network through the network control unit, when the ID registered in the computer and the ID of the expansion unit coincide with each other.

19. A computer that is removably dockable to an expansion unit having a network control unit, comprising:

a collating unit configured to collate an ID of the computer and an ID of the expansion unit in response to a wakeup signal generated from the network control unit; and a section configured to permit the computer to use the network control unit when the collated ID of the computer coincides with the collated ID of the expansion unit.

* * * * *